(12) United States Patent
Turner

(10) Patent No.: US 8,438,803 B2
(45) Date of Patent: *May 14, 2013

(54) CABLE PROTECTION SLEEVE FOR BUILDING FRAMING

(76) Inventor: Bruce H. Turner, Palo Alto, CA (US)

(*) Notice: Subject to any disclaimer, the term of this patent is extended or adjusted under 35 U.S.C. 154(b) by 1064 days.

This patent is subject to a terminal disclaimer.

(21) Appl. No.: 12/029,595

(22) Filed: Feb. 12, 2008

(65) Prior Publication Data

US 2008/0127582 A1 Jun. 5, 2008

Related U.S. Application Data

(63) Continuation-in-part of application No. 11/308,329, filed on Mar. 16, 2006, now Pat. No. 8,191,323.

(51) Int. Cl.
*E04C 2/52* (2006.01)

(52) U.S. Cl.
USPC ............................................ 52/220.8

(58) Field of Classification Search ................ 52/220.1, 52/220.8, 653.1, 717.06, 722.1, 723.2, 731.5, 52/731.9, 733.2; 174/24, 481, 60, 64
See application file for complete search history.

(56) References Cited

U.S. PATENT DOCUMENTS 8,191,323 B2* 6/2012 Turner ........................ 52/220.1
2005/0126094 A1* 6/2005 Shimizu et al. ............ 52/220.1

FOREIGN PATENT DOCUMENTS

EP 0486299 * 5/1992

* cited by examiner

*Primary Examiner* — Jessica Laux
(74) *Attorney, Agent, or Firm* — Sheldon Mak & Anderson; Raymond E. Roberts

(57) ABSTRACT

A sleeve for protecting a utility conduit or conduits passing through a hole in a stud used in building construction. A body portion forms a longitudinally extending hollow trough having side edges, wherein each said side edge portion has overlapable or interlockable fingers. The trough includes a circular side section, with a diameter defining a body width. This circular side section is changeable by compression with either the human hand or a conventional hand-tool to adapt the body width, and thus the sleeve, to coincide with a potential range of stud hole sizes. Engagement of the sleeve in the hole is achievable by placing an inserted end into the hole and pressing a worked end. A stop portion at the worked end stops insertion of the sleeve beyond the stud face, and a retention portion in the sleeve affirmatively retains the sleeve within the hole once thus inserted.

14 Claims, 9 Drawing Sheets

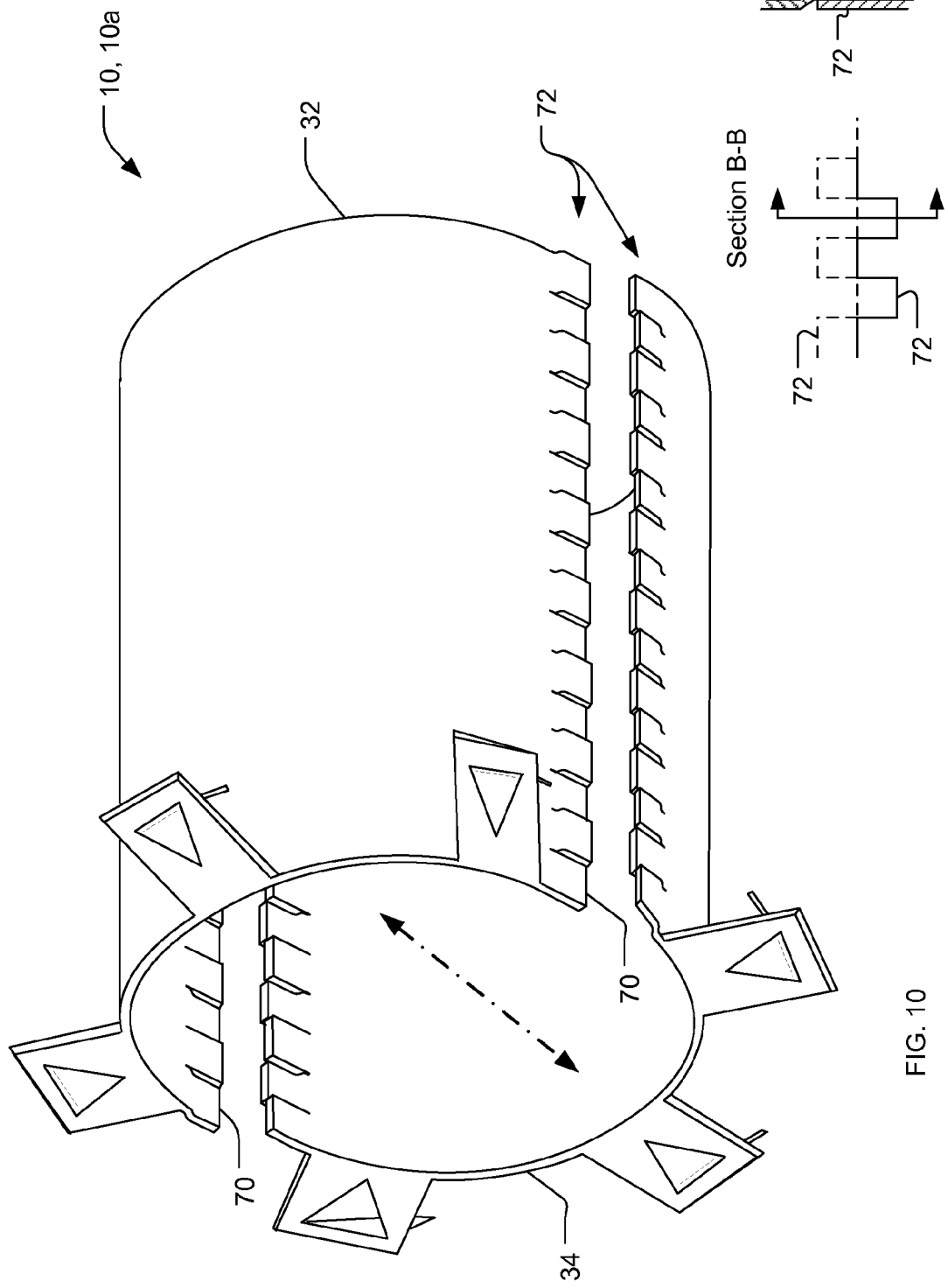
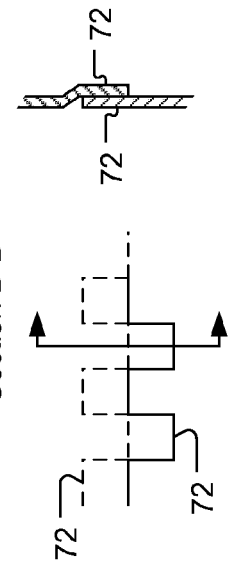
FIG. 10
FIG. 11a
FIG. 11b

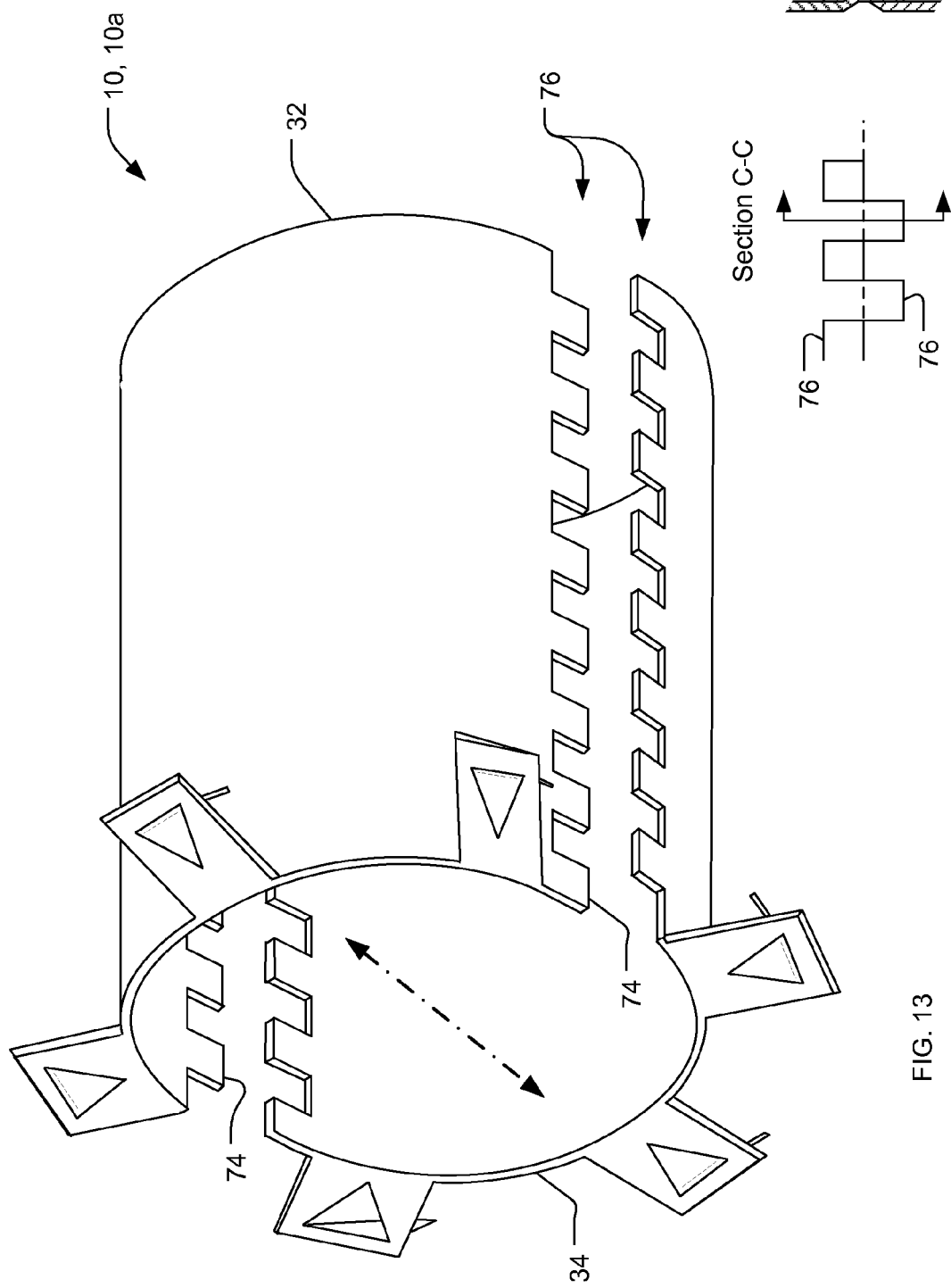

CABLE PROTECTION SLEEVE FOR BUILDING FRAMING

CROSS-REFERENCE TO RELATED APPLICATIONS

This is a continuation-in-part of application Ser. No. 11/308,329, filed Mar. 16, 2006, hereby incorporated by reference in its entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Technical Field

The present invention relates generally to electrical conductors and insulators, and the apparatus specialized to mounting, protecting, encasing in conduits, and housing insulators, and more particularly to conduits and housings mounted on, in or through the walls of building structures.

2. Background Art

In most types of buildings today framing members, commonly called studs, are widely used in wall construction. Such studs are usually of wood or sheet metal, with the former typically used in residential buildings and the latter more common in commercial buildings. In a single family residence hundreds of studs may be used and in multi-family residences and commercial buildings thousands can be used. In most cases the studs are ultimately covered on both sides with wallboard, drywall, paneling, etc., thus enclosing them and the spaces between them within walls.

In stud-based construction it is usually necessary to run utility conduits through the studs before they are covered with wall surfacing. The nature of such conduits can vary widely, and herein is used generally to mean any means of conveying a utility. The earliest examples are conduits for plumbing used to convey fresh and waste water. Some more recent examples include pneumatic lines, used both to convey pressurized gasses and vacuum. Of course, in the last one-hundred years the most widely encountered example is electrical power wiring utility conduits (including, without limitation, bare wire [no longer widely used]; fabric and plastic clad wire by itself; and such encased in either flexible or rigid, metallic or non-metallic, pipe or cable sheathing). For instance, every room in residences, offices and stores today usually has multiple power receptacles, one or more lighting fixtures, and one or more switch stations for these. Also, of dramatically increasingly importance today, are utility conduits for communications. Modern homes and offices can employ low voltage electrical wiring for telephones, computer networks, door bells, speakers for intercoms and stereos, etc. Similarly, coaxial cable is widely used for television and video security, and even optical cable is now starting to be used widely.

For the sake of this discussion, the manner in which utility conduits are put into walls can be generally classified as either routing through through-notches in studs or routing through through-holes in studs. Through-notches are sections cut out of the edges of studs that will later be adjacent to a wall covering. This approach has been widely used in the past but is now largely out of favor because it is felt to unduly undermine stud and wall strength. Additionally, for reasons that will be discussed presently, this approach undesirably puts utility conduits close to a wall surface, rather than in a wall center furthest away from all such surfaces.

Most utility conduits today are therefore run through through-holes in studs. For example, in residential home construction a plumber, electrician, or communications technician will typically drill holes through the centers of wooden studs to run their pipe or cable before both sides of a wall are covered, thus hiding the utility conduits within the walls. Alternately, a crafts person may have to run utility conduits after construction.

Coincidental with our use of such hidden utility conduits has been our desire to protect them, both as and after the walls are covered. Most walls today are covered by nailing or screwing wall cover material to the studs, thus exposing the conduits passing through the studs to the risk that one of these nails or screws will damage them. Similarly, once utility conduits are "hidden" within a wall, they are at risk from anything that later penetrates the wall. Potentially, such penetration can occur anywhere in a wall and all points of a utility conduit are thus seemingly at risk. As a practical matter, however, such penetration usually is at studs and poses the greatest risk there. For example, the proud owner of a new house may want to drive a nail into a wall to hang a mirror. If this hypothetical handy-person lacks foresight, and simply drives their nail into the wall anywhere, the chances are that it will not be driven into a stud and that the mirror will not be well secured. If, per chance, the nail in this scenario encounters a utility conduit one or the other may well simply be pushed aside and the utility conduit then will not sustain critical damage. In contrast, if our handy-person is a bit more savvy about mechanics, they may seek a stud to drive their nail into, to insure that their mirror will be well secured. The handy-person may then, for instance, employ the time-honored method of thumping the wall and listening for changes in tone to determine where a stud is or they may employ an electronic stud detector. Unfortunately, if per chance the nail in this scenario is driven into a stud and there encounters a utility conduit, say, an electrical power cable, the stud will tend to hold the cable relatively fixed and this will increase the likelihood that the nail will penetrate it, potentially shorting the conductors and starting a fire.

The construction industry, regulatory authorities, and people in general have long appreciated the need to shield utility conduits at studs hidden within walls, and various approaches to this have been tried. For example, U.S. Pat. No. 4,924,646 by Marquardt; U.S. Pat. No. 3,689,681 by Searer at al.; U.S. Pat. No. 3,553,346 by Ballantyne; U.S. Pat. No. 3,297,815 Drettmann; U.S. Pat. No. 3,211,825 by Clos; and U.S. Pat. No. 3,211,824 Heiman all teach inserts usable with through-notching in studs. Basically, these inserts include a metal plate portion that protects any utility conduits running through the insert.

Another approach is taught in U.S. Pat. No. 3,240,869 by Jureit. Here a simple plate with widely spaced apart teeth is hammered onto a wooden stud. Doing this over the opening of a through-notch is all that is explicitly disclosed, but a second plate could presumably be put on the opposite side of the stud as well, and two such plates could presumably even be used on alternate sides of a stud to protect utility conduits running through a through-hole.

U.S. Pat. No. 6,642,445 by Lalancette and U.S. Pat. No. 6,061,910 by Williamson teach plates specifically for use over through-holes. These both have prongs to be driven into wooden studs, to retain the plate in place. It is the present inventor's understanding that the "stud shield" of Williamson is the most commonly used utility conduit shield in the United States today.

U.S. Pat. App. 2003/0126824 by Jensen and U.S. Pat. No. 5,595,453 by Nattel et al.; U.S. Pat. No. 5,163,254 by Zastrow et al.; and U.S. Pat. No. 4,050,205 by Ligda all teach alternate plate-based schemes for protecting utility conduits in stud through-holes. Nattel et al. and Ligda are noteworthy because they are for use with sheet metal type studs, and Zastrow et al. employs adhesive attachment to a stud surface rather than tooth, prong, or barb penetration into wooden stud material.

U.S. Pat. No. 5,079,389 by Nelson; U.S. Pat. No. 3,926,030 by Baillie; U.S. Pat. No. 3,855,413 also by Baillie; and U.S. Pat. No. 2,870,242 by Wilkerson all teach sleeves or sheaths that are inserted through a through-hole. Nelson's approach employs two hollow cylinders, with one being inserted inside the other and individual wires (the special utility conduits of concern here) then being pulled through the combination. This protects against abrasion with the through-hole of the stud as well as providing shielding. Baillie's approaches both employ a metal tube with outwardly protruding dimples. The tube is hammered into a slightly larger through-hole in a wooden stud and interference of the protruding dimples with the wooden stud material causes the tube to be retained in place. Wilkerson's approach employs one or more tubular metal sheaths that are driven into a slightly larger through-hole in a wooden stud. The sheaths are slit along their length and are desirably tapered. The act of driving the sheath or an assembly of two or more of them in concentric arrangement into a through-hole causes the diameter of the sheaths to contract. Friction against the through-hole in the wooden stud or against an outer-more sheath then holds the respective sheaths in place.

Lastly, U.S. Pat. No. 2,115,000 by Abbott teaches a sleeve or sheath approach for use with through-notching. This solution is quite elaborate and material-intensive. However, having been filed for in 1935 and issuing in 1938, this prior art reference particularly serves to illustrate how long we have considered shielding utility conduits very important and what lengths we will go to achieve this.

Unfortunately, all of the presently used approaches to shielding utility conduits have limitations or involve trade-offs. For example, as noted above, all of the approaches that are specific for use with through-notching are undesirable because through-notching undermines the strength of the studs and ultimately the walls that they are part of. Additionally, since a through-notch is inherently proximate to one side of a wall, any utility conduits passing through such through notches tend to be held proximate to that wall surface. A nail or screw that might not be long enough to reach a utility conduit in the center of a wall thus might still be long enough to reach and damage utility conduits held proximate to a wall surface. Granted, the shielding over the through-notch should help protect the conduits within it, but this still brings the rest of the conduits closer to one wall and generally exposes them to possible damage by shorter penetrations.

All of the side-of-stud plate-based approaches, both for use over through-notches and through-holes, also have another inherent limitation. They all place a hard shield proximate to a wall surface that impedes driving any nails or screws there. Of course, this is desirable if a long nail or screw would reach underlying utility conduits. But this is not necessarily always the case. For example, in the United States 2×4" or 2×6" studs are used in most construction, and ⅝" wall covering may typically be used. If a 1" through-hole is drilled in the center of a 2×4" stud, this means, roughly, that nails or screws as long as 2" could still even used be adjacent to the through-hole without reaching the through hole. Obviously, this possibility is totally foreclosed if a metal side-of-stud plate is used. Furthermore, side-of-stud plates inherently have some thickness and this tends to slightly further separate the wall coverings above such plates than elsewhere. This can result in a wall covering having an aesthetically unpleasing buckled or warped appearance.

Even the simplest side-of-stud plate-based approaches have a trade-off. While flat plates with projections (teeth, prongs, or barbs) are easy to make (see e.g., Williamson's stud shield, discussed above), they also require an undue quantity of material to make. Firstly, such a plate usually has to have portions extending above and below the through-notch or through-hole being covered for the projections that will be driven into a wooden stud. Secondly, even when this is not the case (see e.g., Lalancette's plate for use in limited applications and Zastrow et al's adhesive plate), side-of-stud plates need to extend more than the vertical width of the through-notch or diameter of the through-hole to protect against nails or screws driven into a stud adjacent to the plate but at an angle such that utility conduits might still be damaged. Side-of-stud plate-based approaches are also unsuitable for use after wall covering, e.g., for running new utility conduits in existing construction.

This material-intensive nature of plate-based approaches is not well appreciated in the industry, largely because it has slowly grown in importance and "conventional wisdom" is that plates are fine and their cost is simply one that must be endured. By way of example, consider that in the 1920's and 1930's each room in a typical house in the United States might have as few as one power receptacle and one light receptacle. In the late 1940's, as electrical appliances became popular, more power receptacles per room came to be used, particularly in rooms like kitchens, and wall switches for lighting also became popular. By the 1960's and 1970's every wall of appreciable size in a room usually had one or more power receptacles. This was because the consumers of home and office space tended to want it, and particularly because regulatory agencies dictated this in building codes and aggressively enforced it with permit and inspection schemes. Today this trend continues, only now for communications cable as well. The point here is that we have slowly grown to use roughly ten-fold as much utility conduit shielding as we once did, and the materials for that and their cost have become substantial.

Center-of-stud specific approaches can inherently be more materials efficient, and thus potentially more economical. Nonetheless, the multi-cylinder approach by Nelson and multi-sheath embodiments in accord with Wilkerson's approach are actually not economical with respect to the amount of material they require.

In contrast, single-sheath embodiments in accord with Wilkerson's approach are very economical with respect to material, but they have to be manufactured with awkward limitations or else used in a relatively precise manner. Wilkerson teaches that its sheaths are desirably tapered. If such taper is appreciable, the sheaths will seemingly fit in through-holes having a wide range of diameters. The problem is, however, that Wilkerson's sheaths have no mechanism other than surface friction to retain them in a through-hole, and the greater the degree of taper they have the more likely they are to simply pop back out of a through-hole. Conversely, if Wilkerson's sheaths have little taper they must be used in through-holes having a limited range of diameters. For instance picture an electrician who has just broken his or her 1" drill bit. Using ¾" or 1⅛" bits will likely produce holes that will not work for 1" Wilkerson sheaths. Furthermore, with no significant retaining mechanism, Wilkerson sheaths are not reliably useable with sheet metal type studs. [Notably, Wilkerson's filing in 1954 pre-dates the significant use of sheet metal studs and this reference does not teach the use its sheathes in such.]

Similarly, Baillie's dimpled tubes are very economical with respect to material but have other limitations. Baillie specifically teaches that its tubes must also closely fit the through-holes they are used in. Also, even though the first of the patents for this was filed for in 1973, when sheet metal studs where becoming known, Baillie does not teach and apparently it simply was not contemplated that its dimpled tubes could be used in sheet metal studs.

Accordingly, the presently most widely used utility conduit protection scheme, plates affixed to stud edges, is uneconomical and has utilitarian limitations. Similarly, all of the other known plate-based approaches suffer from at least the same problems. Conversely, present center-of-stud specific approaches are either less economical than possible, also have utilitarian limitations, or both. It therefore follows that improved utility conduit protection schemes are desirable.

BRIEF SUMMARY OF THE INVENTION

Accordingly, it is an object of the present invention to provide sleeve for use in building framing to protect utility conduits.

Briefly, one preferred embodiment of the present invention is a sleeve for protecting a utility conduit or conduits passing through a hole in a stud used in building construction. A body portion is provided that forms a hollow trough extending lengthwise, and thus defining a body length. The trough includes a circular side section, with its diameter thus defining a body width. The circular side section is changeable by compression with the human hand or a conventional hand-tool to adapt the body width, and thus the sleeve, to coincide with a range of stud hole sizes. The body portion also includes an inserted end and a worked end at opposite ends of the trough, which permits engaging the sleeve in a stud hole by inserting its inserted end and pressing on its worked end. The body also portion particularly has two edge portions extending between said inserted end and said worked end, wherein each said edge portion has a plurality of overlappable or interlockable fingers. A provided stop portion at the worked end then stops insertion of the sleeve beyond the closest side of the stud. An also provided retention portion then affirmatively retains the sleeve within the hole after insertion.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE SEVERAL VIEWS OF THE DRAWING(S)

The purposes and advantages of the present invention will be apparent from the following detailed description in conjunction with the appended figures of drawings in which:

FIGS. 1-2 depict two embodiments of sleeves in accord with the present invention that as they are being employed, wherein FIG. 1 shows use in a wooden stud and FIG. 2 shows use in a sheet-metal stud.

FIGS. 5a-d are a series of views of another sleeve in accord with the present invention, particularly showing a top view two side views, and a perspective view.

Figure 6:
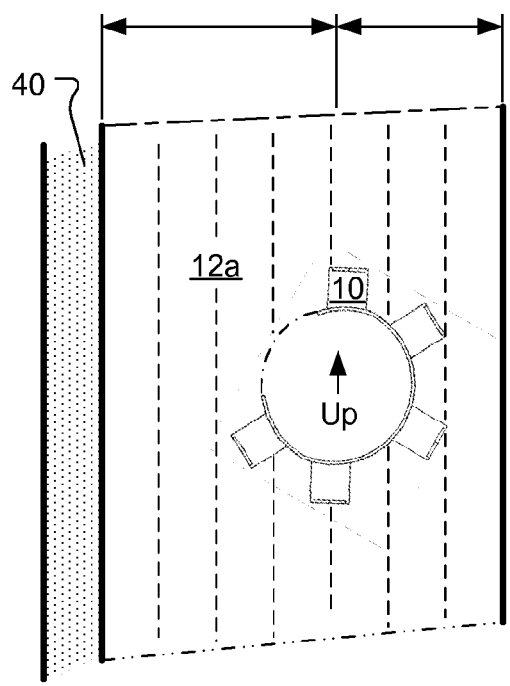

FIG. 6 is an alternate depiction of a sleeve in use.

Figure 2:
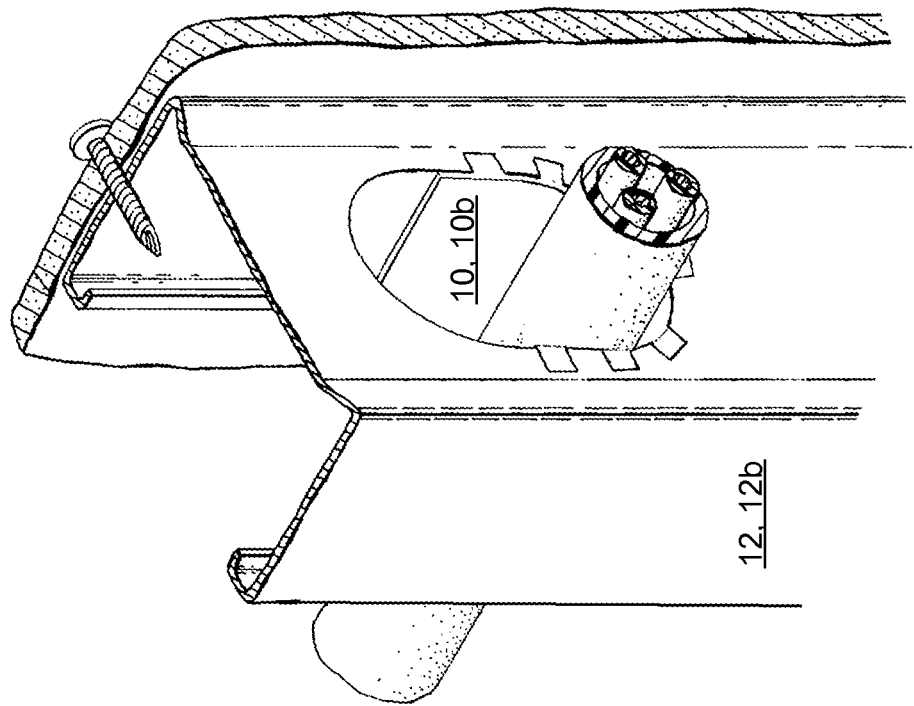
Figure 1:
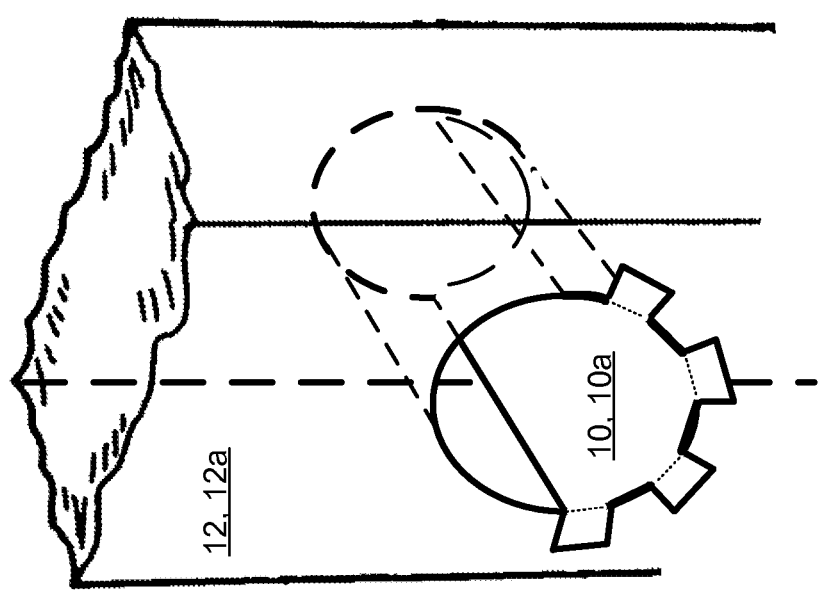
Figure 7:
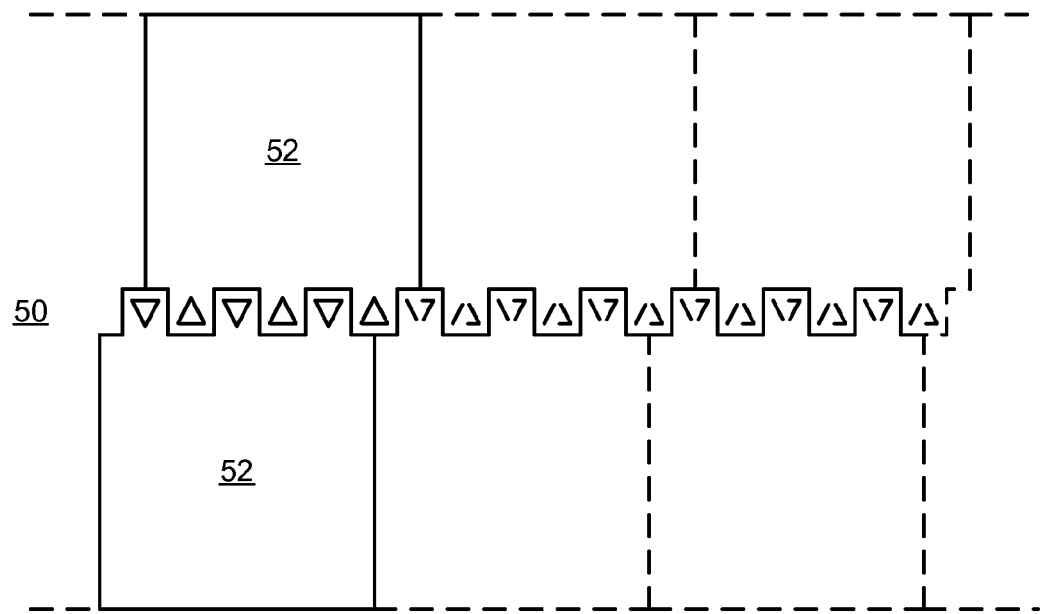

FIG. 7 shows sheet stock with blanks for forming the sleeves of FIGS. 1-2 using common manufacturing techniques.

Figure 4:
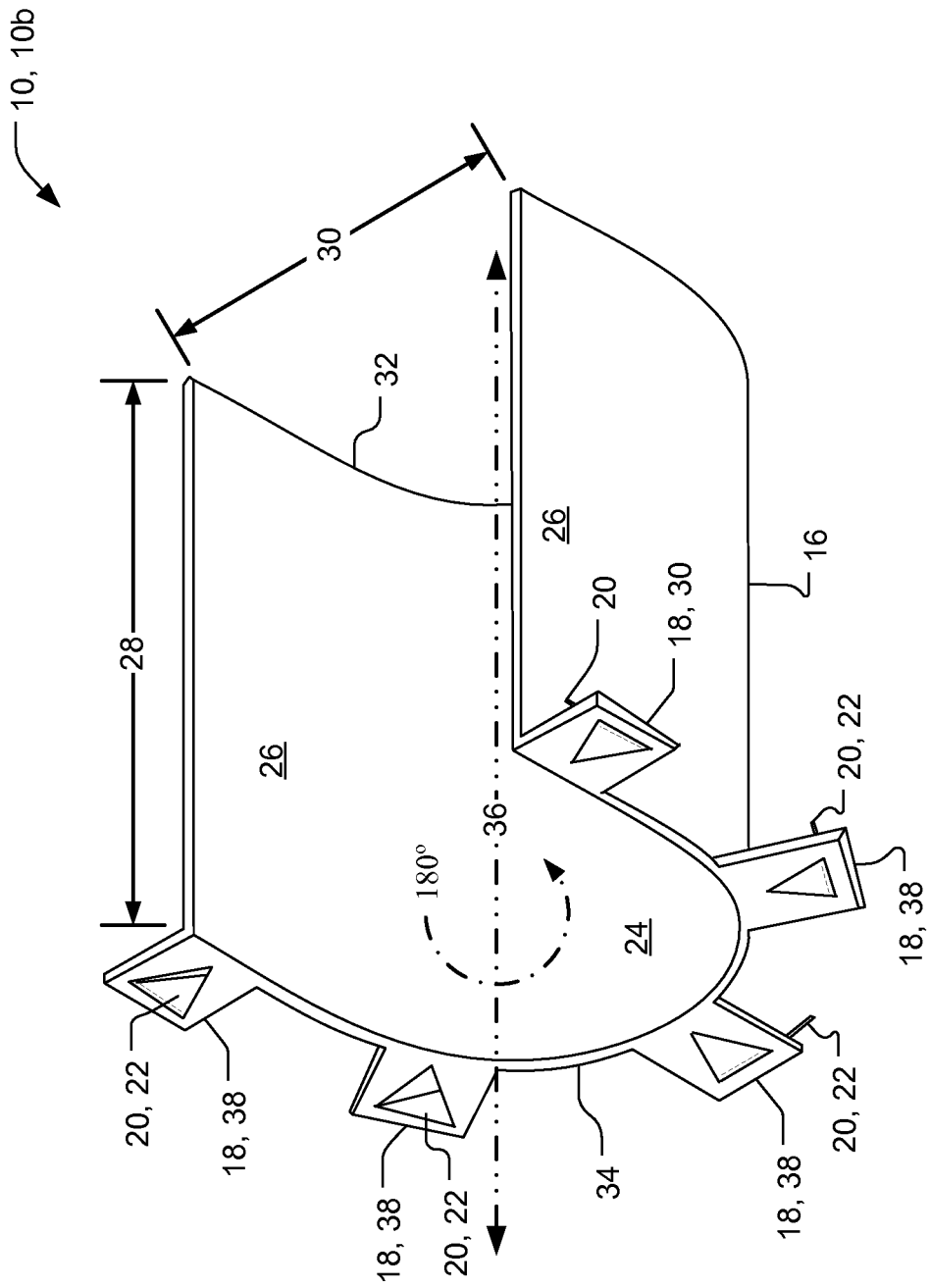
Figure 8:
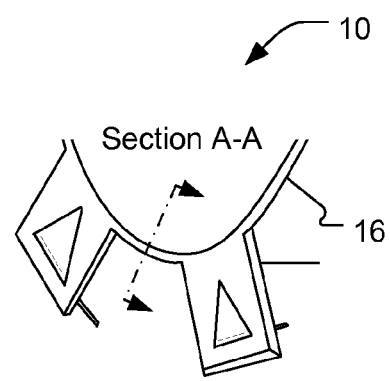

FIG. 8 is a portion of FIG. 4 showing a section and how alternate embodiments of the sleeves in FIG. 9a-d relate to sleeves already discussed.

Figure 9A:
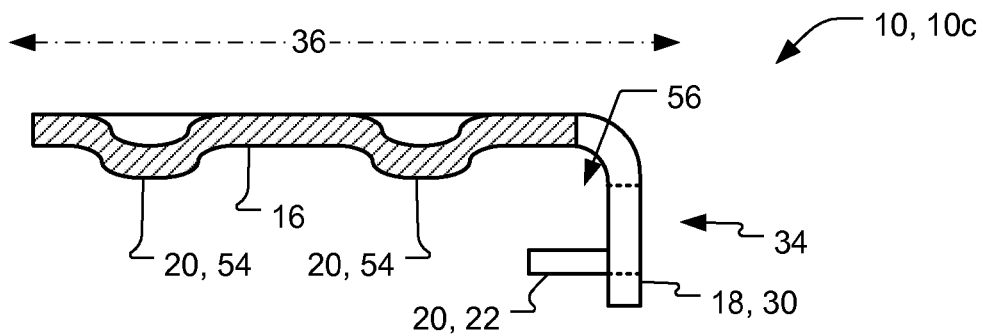
Figure 9B:
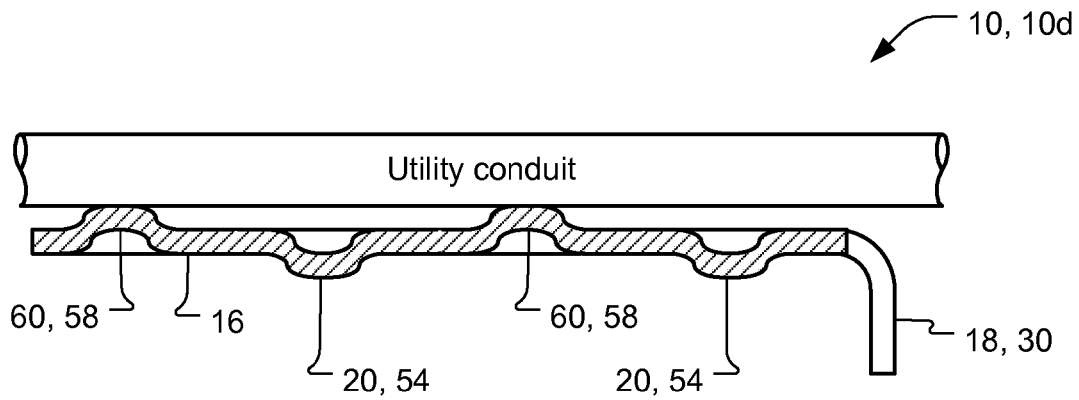
Figure 9C:
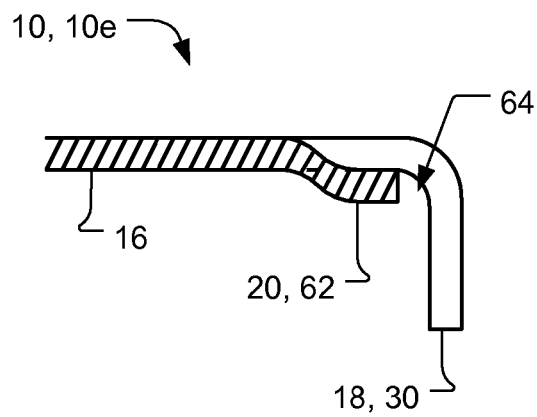
Figure 9D:
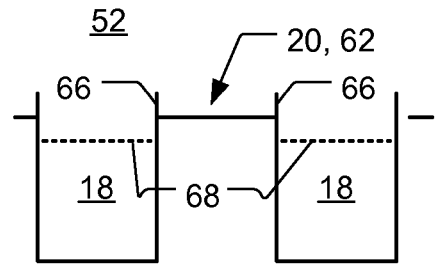

FIGS. 9a-c show cross sectional views equivalent in location to the section in FIG. 8 but here depicting the relevant portions of alternate embodiments of the inventive sleeves, and FIG. 9d shows a partial end view.

FIG. 10 is a detailed perspective view of third embodiment of sleeves (paired) in accord with the present invention.

FIGS. 11a-b show how the fingers of the paired sleeves in FIG. 10 overlap upon assembly, wherein FIG. 11a is a partial view of the fingers region of the paired sleeves defining a section and FIG. 11b shows detail at the defined section.

Figure 12:
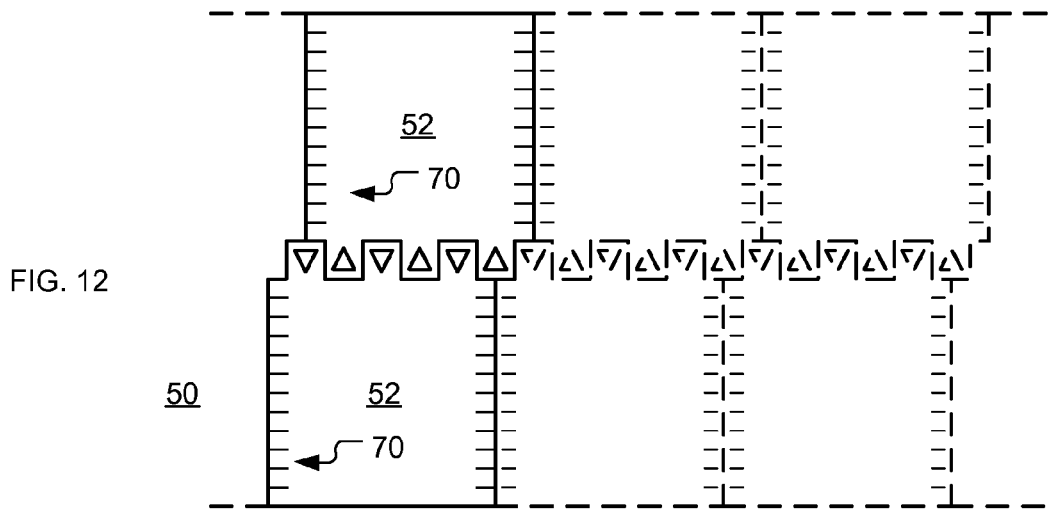

FIG. 12 shows sheet stock with blanks for forming the sleeves of FIG. 10 using common manufacturing techniques.

FIG. 13 is a detailed perspective view of fourth embodiment of sleeves (also paired) in accord with the present invention.

FIGS. 14a-b show how the fingers of the paired sleeves in FIG. 13 interlock upon assembly, wherein FIG. 14a is a partial view of the fingers region of the paired sleeves defining a section and FIG. 14b shows detail at the defined section.

Figure 15:
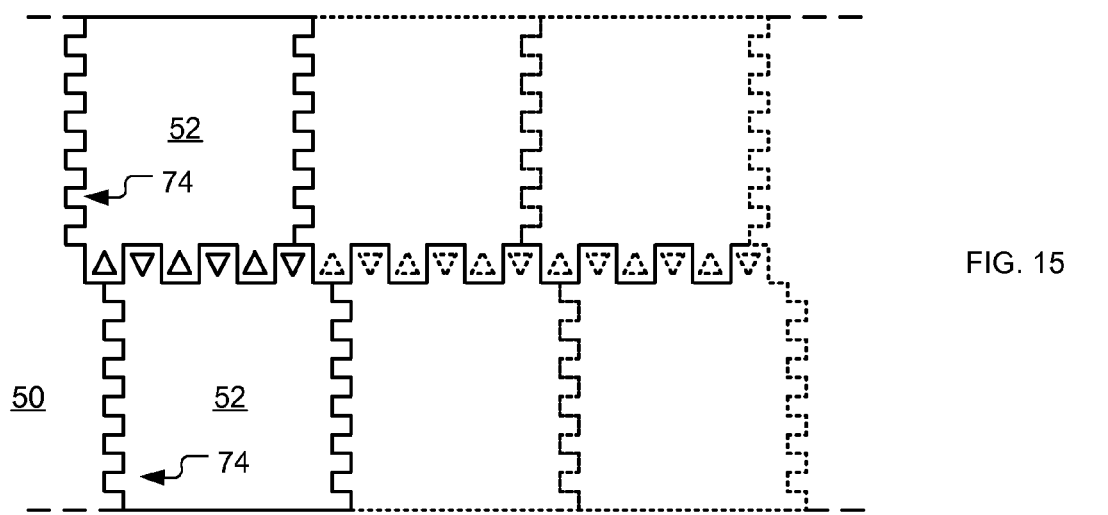

FIG. 15 shows sheet stock with blanks for forming the sleeves of FIG. 13 using common manufacturing techniques.

Figure 16:
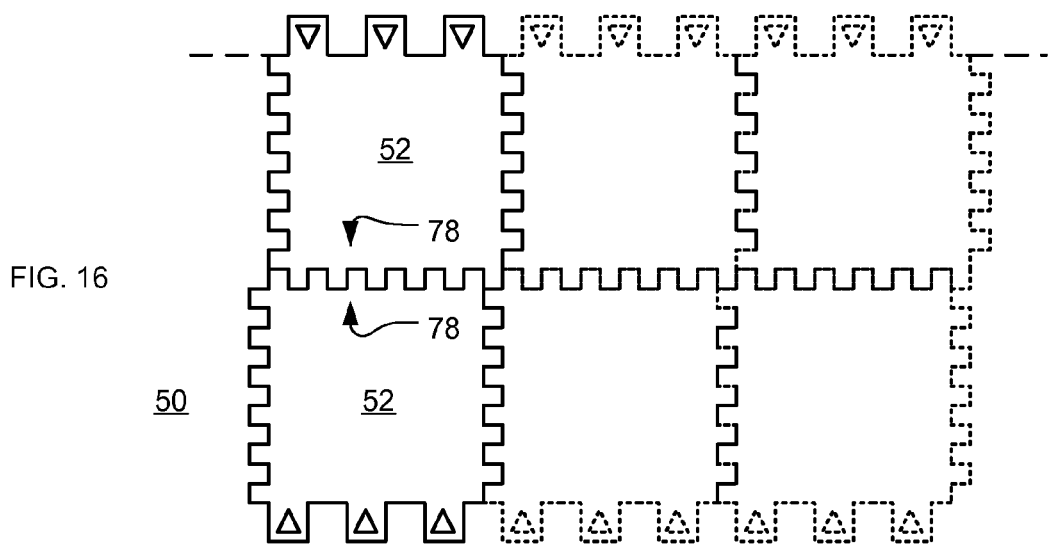

And FIG. 16 shows sheet stock with blanks for forming an alternate variation of the sleeves of FIG. 13 using common manufacturing techniques.

In the various figures of the drawings, like references are used to denote like or similar elements or steps.

DETAILED DESCRIPTION OF THE INVENTION

A preferred embodiment of the present invention is a sleeve for use in building framing to protect utility conduits. As illustrated in the various drawings herein, and particularly in the views of FIGS. 1-4, 10 and 13, preferred embodiments of the invention are depicted by the general reference character 10.

FIGS. 1-2 depict two embodiments of sleeves 10 in accord with the present invention that are being employed. The sleeves 10 are used with studs 12 and, while reference characters are assigned herein based on the order in which elements and features are first discussed, it should nonetheless be appreciated that the sleeves 10, and their elements, comprise the present invention while the studs 12, and their features, merely comprise work pieces upon or with which the present invention may be employed. To facilitate the following discussion, the sleeve 10 in FIG. 1 is termed a shallow-trough sleeve 10a and the sleeve 10 in FIG. 2 is termed a deep-trough sleeve 10b. The stud 12 in FIG. 1 is a conventional wood stud 12a and the stud 12 in FIG. 2 is a conventional sheet-metal stud 12b.

Figure 3:
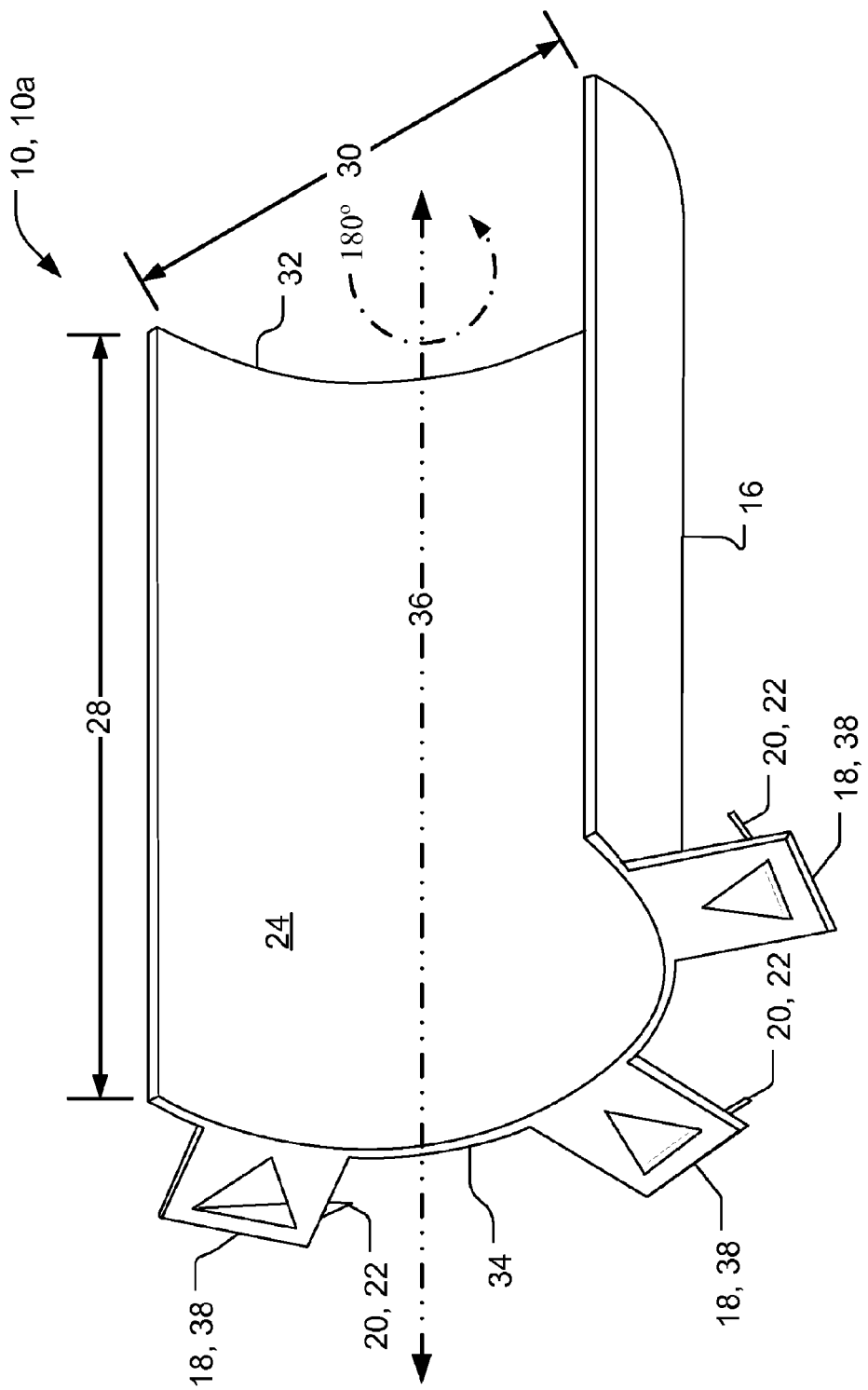
FIGS. 3-4 are more detailed perspective views of the sleeves of FIGS. 1-2, respectively.

FIGS. 3-4 are perspective views of the sleeves 10, 10a-b shown without the studs 12, 12a-b. The sleeves 10, 10a-b have three major features: a body 16, a stop mechanism 18, and a retainer mechanism 20 (here barbs 22).

The body 16 generally has a trough shape, with the intent for this being that the sleeves 10, 10a-b are generally employed so that gravity causes any utility conduits running through them to rest, at least partially, in the trough and not generally contact edges of the through-hole or any other portion of the stud 12, 12a-b. See e.g., FIG. 2. The shallow-trough sleeve 10a, depicted in FIGS. 1 and 3, thus has a circular side section 24 that defines the shallow trough of this type of sleeve 10, 10a. In contrast, the deep-trough sleeve 10b, depicted in FIGS. 2 and 4, has a circular side section 24 as well as two nominally straight side sections 26 that extend off of the circular side section 24 as shown. This accordingly defines the deep trough of this type of sleeve 10, 10b. Obviously, the shallow-trough sleeve 10a can be employed in truly round through-holes (e.g., FIG. 1) as well as in elongated through-holes (e.g., FIG. 2), while the deep-trough sleeve 10b will most easily be employed in elongated through-holes.

The inventor anticipates that essentially all embodiments of the sleeves 10, 10a-b will have circular side sections 24 that comprise an 180 degree arc, and that the majority of embodiments will have circular side sections 24 in the range of 180-270 degrees. It should be appreciated, however, that the spirit of the present invention also encompasses embodiments in which the circular side section 24 resembles a spiral extending greater than 360 degrees. For example, a sleeve 10, 10a can have a circular side section 24 initially extends 370 degrees, and this can then be "opened" to 362 degrees during installation into a "loose" through-hole, or this can be "closed" to 382 degrees during installation into a "tight" through-hole. Such embodiments can thus insure full 360 degree protection despite some variation in through-hole sizes.

The body 16 has a body-length 28 desirably extending at least the thickness of the stud 12 that the sleeve 10, 10a-b is used with. The body 16 also has a body-width 30 that is nominally close to the diameter (i.e., the hole-width) of the through-hole in the stud 12 that the sleeve 10, 10a-b is inserted into. Generally, the body-width 30 can be less than the hole-width, as long as the retainer mechanism 20 can still function to retain the sleeve 10, 10a-b in place. Furthermore, a major point of novelty for the inventive sleeves 10, 10a-b is that their body-width 30 can also be exactly equal to or less than the hole-width. The nature of the sleeves 10, 10a-b here particularly permits manually changing their body-width 30 somewhat as needed, either by squeezing them with the human hand or with any of various conventional hand-tools that most installers of the sleeves 10, 10a-b will typically already have with them.

To facilitate discussion of other aspects of the sleeves 10, 10a-b, they can be regarded as having an inserted end 32 and a worked end 34 at longitudinally opposed ends of the body 16, as shown in FIGS. 3-4. To also facilitate discussion, the sleeves 10, 10a-b can be regarded as having a central axis 36, as also shown in FIGS. 3-4

The inserted end 32 is that which is inserted into a through-hole, and the worked end 34 is that to which pressure is applied to urge the sleeve 10, 10a-b into the through-hole. With reference again also to FIG. 1-2, it should be noted that each sleeve 10, 10a-b is installed from either one face or the other of a stud 12, 12a-b (or two sleeves 10, 10a-b can be installed in the same hole, one from each face of the stud 12, 12a-b if desired). This need for access to only one face of a stud 12, 12a-b facilitates using the sleeves 10, 10a-b even if wall coverings are otherwise also covering the stud 12, 12a-b.

For example, using the sleeves 10, 10a-b can reduce the damage needed to add utility conduits into existing, closed walls.

The stop mechanism 18 is provided at the worked end 34 of the body 16, where it serves to prevent insertion of the sleeve 10, 10a-b too far into or even all the way through the through-hole. Generally, the stop mechanism 18 will end up closely adjacent to the proximate face of the stud 12, 12a-b, but this is not a strict requirement and an example is discussed presently. The inventor's preferred form of the stop mechanism 18 is a plurality of spaced-apart tabs 38, as shown in FIGS. 3-4. This approach particularly facilitates economical manufacture of some embodiments of the sleeves 10, 10a-b. This also, however, is not a requirement. For example, as little as one or two tabs, a greater plurality of tabs, or even a continuous lip can also be used as the stop mechanism 18.

The retainer mechanism 20 serves to retain the sleeve 10, 10a-b in a stud 12, 12a-b once it has been inserted into a through-hole. FIGS. 3-4 show one form of retainer mechanism 20 integrated with the stop mechanism 18 (toward the worked end 34 of the sleeve 10, 10a-b). However, the retainer mechanism 20 can also have many others forms and can also be located in the body 16, even all the way at the inserted end 32.

Figure 5B:
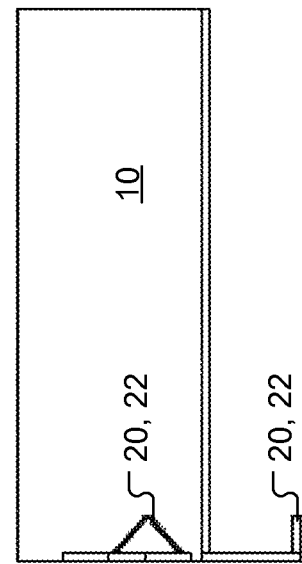
Figure 5D:
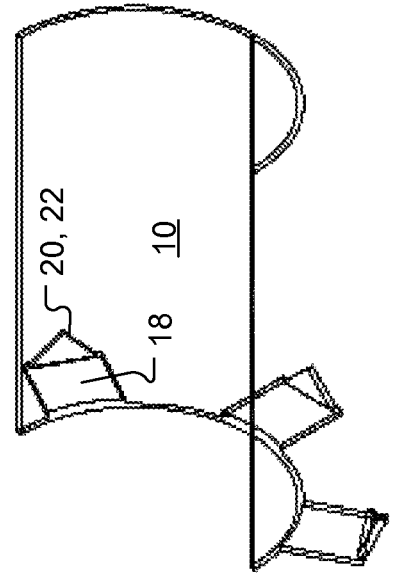
Figure 5A:
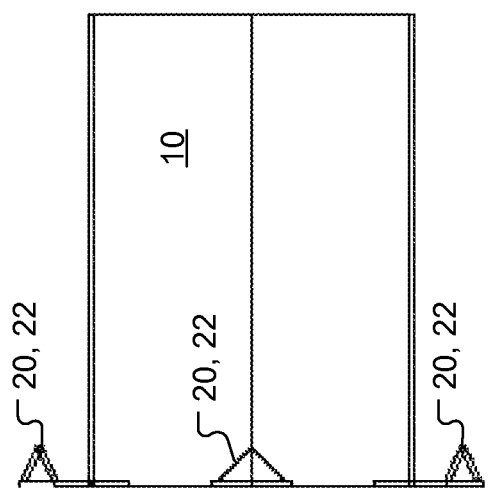
Figure 5C:
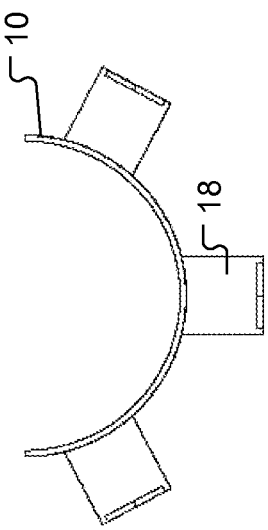

FIGS. 5a-d are a series of views of another sleeve 10, 10a that is in accord with the present invention. FIG. 5a is a top view, FIG. 5b-c are side views, and FIG. 5d is a perspective view. FIGS. 5a-d show an alternate retainer mechanism 20, still comprising barbs 22 and still located on the stop mechanism 18, but now located at a different place on the stop mechanism 18.

FIG. 6 is another depiction of a sleeve 10 in use. This might, for instance, be the same sleeve 10b as depicted in FIG. 2, only formed differently here to fit the different-shaped hole in the stud 12a shown. As can be seen, the sleeve 10 here provides more than 180 degrees of protection (more like 270 degrees). Also, the sleeve 10 here is installed offset away from an already installed exterior wall 40 (toward a yet to be installed interior wall, not shown), and the sleeve 10 is rotated so that non-protected portions of the hole are at roughly 9-11 O'clock. Both of these practices are desirable in some construction scenarios, and FIG. 6 particularly illustrates that the inventive sleeves 10, 10a-b are able to accommodate these practices. For example, it is common to install exterior wall materials first. Existing penetrations will then be encountered during installation of the sleeves 10 and dealt with (e.g., by the portion of the penetrating object being cut away or by placing the sleeve 10 where it avoids that object). It is also unlikely that there will be later wall penetration from that side, so rotating the sleeve 10 is one way to increase the protection that it will provide against penetrations from the side of most concern (the interior side). As for offsetting the sleeve 10 within the stud 12a toward or away from a particular wall, this permits crafts people to deal with pragmatic issues like where they can reach with a drill bit to make a hole or avoiding hard to drill through knots in a stud 12a.

Summarizing briefly, the prior art generally comprises devices for use with through-notches and through-holes. The through-notch approach is now disfavored, for the reasons discussed, and it is advantageous that a device work with the through-hole approach. It should now be apparent that the inventive sleeves 10, 10a-b fulfill this goal. As also already discussed, the prior art through-hole devices generally comprise devices for either side-of-stud or center-of-stud use, and side-of-stud prior art devices are inherently uneconomical. This makes it desirable that a new device be of the center-of-stud type. It should now also be apparent that the inventive sleeves 10, 10*a-b* also fulfill this goal. Finally, center-of-stud type prior art devices are generally uneconomical, and many also have undesirable feature limitations. We now discuss how the inventive sleeves 10, 10*a-b* also overcome these disadvantages.

In the interest of brevity we state the following generalizations with confidence that most skilled practitioners in the present art will at least agree with them in principle. First, simply put, two factors determine whether a device for utility conduit protection is economical: (1) how it is made and (2) what it is made of.

Sheet-metal roll slitting and die-stamp fabrication are well known, widely used, and generally considered inexpensive, when expense is a consideration. Low grade steel sheet stock (optionally coated or plated to resist corrosion) is also well known, widely used, regarded as inexpensive, and it is considered generally suitable for use with roll slitting and die-stamping fabrication techniques. Notably, these techniques and this class of materials are also probably the most economical ones presently available with which to construct embodiments of the inventive sleeves 10, 10*a-b*. The spirit of the present invention, however, is not necessarily limited to presently economical techniques and materials. For example, without limitation, cast metal, fiber-glass, and carbon-fiber approaches may become economical enough generally and, for some specialized applications, already are viable alternative approaches.

FIG. 7 shows sheet stock 50 with two blanks 52 for the sleeves of FIGS. 1-4 represented in solid outline, as well as positions for adjacent blanks shown in ghost outline. As those skilled in the art will appreciate, slitting from sheet-meal roll stock or stamping out blanks 52 from sheet-meal flat stock can be done efficiently for various quantities. Various features of a sleeve 10, 10*a-b* can also be formed concurrently in these operations (especially if die-stamping is used), or in a subsequent mandrel-forming type operation. It is therefore anticipated that most sheet-metal-based embodiments of the inventive sleeves 10, 10*a-b* will entail as few as these two forming operations.

FIG. 8 is a portion of FIG. 4 showing how alternate embodiments of the sleeves 10 in FIGS. 9*a-d* relate to the sleeves 10, 10*a-b* as already discussed. Specifically, FIG. 8 particularly includes a section A-A of a generic sleeve 10 and FIGS. 9*a-c* show cross sectional views equivalent in location to section A-A but depicting the relevant portions of alternate embodiments of sleeves 10 that are now described.

For the sake of discussion, the sleeve 10 in FIG. 9*a* is termed a dimple interference sleeve 10*c*. The salient feature here is that the retainer mechanism 20 here includes a barb 22 in the stop mechanism 18 as well as one or more outward dimples 54 that extend away from the body 16 and the central axis 36 of the sleeve 10, 10*c*. The outward dimples 54 here interferingly engage with the sides of a hole in a stud 12 to retain the sleeve 10, 10*c* in place. This approach works well with wooden studs 12*a* as long as the body 16 of the sleeve 10, 10*c* is properly manually formed to coincide with the size of the hole in the stud 12*a* during installation. This approach also works with sheet-metal studs 12*b* as long as at least one outward dimple 54 is manufactured close enough to the worked end 34 of the sleeve 10, 10*c* to form a region 56 in which the wall of the sheet-metal stud 12*b* proximate to the hole is trapped during installation. Of course, the outward dimples 54 alone are an adequate retainer mechanism 20 for many usage scenarios, but the barb 22 is shown in the embodiment in FIG. 9*a* to emphasize that there is no particular reason that the sleeves 10 cannot include multiple types elements as parts of the overall the retainer mechanism 20.

For the sake of discussion, the sleeve 10 in FIG. 9*b* is termed a dimpled stand-off sleeve 10*d*. In addition to having one or more outward dimples 54 here to serve as the retainer mechanism 20, this embodiment includes inward dimples 58 to serve as a stand-off mechanism 60 that distances any utility conduits running through the sleeve 10, 10*d* away from the body 16. Various motivations may exist for having this optional stand-off mechanism 60. For example, its presence reduces contact, and thus friction, with the body 16 of the sleeve 10, 10*d*. During initial installation of utility conduits, this feature can reduce the dynamic friction encountered in drawing in the utility conduits. During removal of utility conduits that are already installed, as well as when utility conduits are moved, say by seismic stresses moving building walls, this feature can also reduce the static friction encountered. Other motivations here may relate to the particular nature of utility conduits. By reducing body 16 contact with the utility conduits thermal transfer is also reduced. For instance, the body 16, which in many cases will be of metallic material, will now transfer less heat into or out of the utility conduits. Similarly, also since the body 16 may be of metallic material, inductive heating of the sleeve 10, 10*d* by high currents in the utility conduits should be reduced, and inductive choking by the sleeves 10, 10*d* of high frequency signals in the utility conduits should also be reduced.

And for the further sake of discussion, the sleeve 10 in FIGS. 9*c-d* is termed a tang sleeve 10*e*. FIG. 9*c* shows a partial cross section of the tang sleeve 10*e* (much as FIGS. 9*a-b* show the other sleeves 10, 10*c-d*), and FIG. 9*d* shows the relevant portion of the tang sleeve 10*e* in an intermediate stage of manufacture (much as FIG. 7 shows such for the sleeve 10, 10*a*). The salient feature in FIGS. 9*c-d* is a tang 62 that serves as the retainer mechanism 20. Similar to the outward dimples 54 of the dimple interference sleeve 10*c*, described above, the tang 62 here extends outward away from the body 16 and the central axis 36 of the sleeve 10, 10*e*. In use with wooden studs 12*a*, the tang 62 operates similarly to the outward dimple 54, interferingly engaging with the material of the stud 12, 12*a*. To work especially well with sheet-metal studs 12*b*, however, the tang 62 can be manufactured to end short of the stop mechanism 18, thus forming a region 64, as shown, in which the wall next to a hole in a sheet-metal stud 12*b* can particularly be trapped and the sleeve 10, 10*e* thus retained in place.

Finally, FIG. 9*d* shows how the tang 62 can be easily formed, say at the flat-stock stage in a die-stamping manufacturing scenario. Extended cuts 66 can easily be made while stamping the blank 52 out from sheet stock 50, and a bend location 68 for the stop mechanism 18 can be distanced from the proximal edge of the tang 62 to define the region 64 when the stop mechanism 18 is formed.

FIG. 10 is a detailed perspective view of an alternate embodiment of the inventive sleeves 10, specifically of a paired set of sleeves 10*f*. Here the two sleeves 10, 10*f* each have side edges 70 that extend between their respective inserted ends 32 and worked ends 34, wherein fingers 72 are provided along the lengths of the side edges 70. By assembling the two sleeves 10, 10*f* together in the manner shown, the fingers 72 are caused to overlap, thus serving to prevent the ingress of objects (e.g., nail or staple tips) at the juncture of the two sleeves 10, 10*f*.

FIGS. 11*a-b* show in more detail how the fingers 72 of the paired sleeves 10, 10*f* overlap upon assembly. FIG. 11*a* is a partial view of region at the fingers 72 of the sleeves 10, 10*f* where a section B-B is defined and FIG. 11*b* shows detail at this section B-B. As can be seen, alternating instances of the fingers 72 project outward slightly, thus overlappingly fitting over corresponding alternating non-projecting instances of the fingers 72.

FIG. 12 shows sheet stock with blanks for forming the sleeves of FIG. 10 using common manufacturing techniques. In view of the foregoing discussion of manufacturing techniques, materials, and now also of the structure of the alternate sleeves 10, 10f, skilled artisans should find manufacturing of the inventive sleeves 10, 10f to be straightforward.

FIG. 13 is a detailed perspective view of another alternate embodiment of the inventive sleeves 10, specifically a different paired set of sleeves log. Here the two sleeves 10, 10g each have side edges 74 that extend between their respective inserted ends 32 and worked ends 34, wherein fingers 76 are provided along the lengths of the side edges 74. Unlike the fingers 72 of FIG. 10, however, here the fingers 76 interlock rather than overlap. By assembling the two sleeves 10, 10g together in the manner shown, the fingers 76 are caused to interlock and thus also prevent the ingress of objects (e.g., nail or staple tips) at the juncture of the two sleeves 10, log.

FIGS. 14a-b show how the fingers 76 of the paired sleeves 10, 10g overlap upon assembly. FIG. 14a is a partial view of region at the fingers 76 of the sleeves 10, 10g where a section C-C is defined and FIG. 14b shows detail at section C-C. As can be seen, the interspaced fingers 76 of two of the sleeves 10g interlockingly fit together.

FIG. 15 shows sheet stock with blanks for forming the sleeves 10, 10g of FIG. 13 using common manufacturing techniques. In view of the foregoing discussion of manufacturing techniques, materials, and now also of the structure of the alternate sleeves 10, 10g, skilled artisans should also find manufacturing of the inventive sleeves 10, 10g to be straightforward.

Finally, with reference briefly back to FIG. 3 and FIG. 13, it can now be seen that the same conceptual addition of fingers along an end edge 78 of a sleeve 10 can also be employed. FIG. 16 shows sheet stock with blanks for forming sleeves 10 of this type that use the interlocking principle discussed above. Of course, in straightforward manner, the overlapping principle discussed above (e.g., for FIG. 10) can also be employed along the inserted ends 32 of the inventive sleeves.

While various embodiments have been described above, it should be understood that they have been presented by way of example only, and that the breadth and scope of the invention should not be limited by any of the above described exemplary embodiments, but should instead be defined only in accordance with the following claims and their equivalents.

What is claimed is:

1. A sleeve for protecting a utility conduit passing through a hole in a stud used in building construction, comprising:
    a body portion forming a hollow trough extending longitudinally and defining a body length, wherein said trough has a circular side section with a diameter defining a body width, and wherein said circular side section is changeable to adapt said body width to coincide with a range of sizes of the hole in the stud;
    said body portion further having an inserted end and a worked end at opposed ends of said trough to permit engagement of the sleeve into the hole in the stud by inserting said inserted end into the hole and pressing on said worked end;
    said body portion further having two edge portions extending between said inserted end and said worked end, wherein each said edge portion has a plurality of edge fingers;
    a stop portion at said worked end of said body portion to stop insertion of the sleeve into the hole beyond a proximate face of the stud; and
    a retention portion in the sleeve to affirmatively retain the sleeve within the hole once inserted there in.

2. The sleeve of claim 1, said plurality of edge fingers are overlappingly engage-able with a corresponding said plurality of fingers of a second of the sleeves.

3. The sleeve of claim 1, said plurality of edge fingers are interlockingly engage-able with a corresponding said plurality of fingers of a second of the sleeves.

4. The sleeve of claim 1, further comprising said body portion further having and end portion at said inserted end, wherein each said end portion has a plurality of end fingers that are overlappingly or interlockingly engage-able with a corresponding said plurality of fingers of a second of the sleeves.

5. The sleeve of claim 1, wherein said stop portion includes a plurality of tabs extending distally away from a longitudinal central axis of said body portion.

6. The sleeve of claim 1, wherein said retention portion is integral with said body portion.

7. The sleeve of claim 6, wherein said retention portion includes at least one protrusion extending distally away from a longitudinal central axis of said body portion.

8. The sleeve of claim 1, wherein said protrusion is a dimple or a tang.

9. The sleeve of claim 1, wherein said retention portion is integral with said stop portion.

10. The sleeve of claim 9, wherein said retention portion includes at least one barb extending toward said inserted end of said body portion.

11. The sleeve of claim 1, further comprising a stand-off portion to hold the utility conduit away from said body portion.

12. The sleeve of claim 11, wherein said stand-off portion is a dimple extending distally toward a longitudinal central axis of said body portion.

13. The sleeve of claim 1, wherein said sleeve is a unitary die-stamped sheet metal construct.

14. The sleeve of claim 1, wherein said sleeve is a unitary cast construct.

* * * * *